US012763936B2

(12) United States Patent
Ito et al.

(10) Patent No.: US 12,763,936 B2
(45) Date of Patent: Oct. 13, 2026

(54) KEY MANAGEMENT SERVER DEVICE, QKD SYSTEM, AND KEY MANAGEMENT METHOD

(71) Applicant: KABUSHIKI KAISHA TOSHIBA, Tokyo (JP)

(72) Inventors: Masashi Ito, Kawasaki Kanagawa (JP); Katsuyuki Kimura, Kamakura Kanagawa (JP); Koji Kanazawa, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 0 days.

(21) Appl. No.: 18/760,547

(22) Filed: Jul. 1, 2024

(65) Prior Publication Data

US 2025/0088354 A1 Mar. 13, 2025

(30) Foreign Application Priority Data

Sep. 13, 2023 (JP) ................................ 2023-148034

(51) Int. Cl.
*H04L 29/06* (2006.01)
*G06F 21/00* (2013.01)
(Continued)

(52) U.S. Cl.
CPC .......... *H04L 9/0852* (2013.01); *H04L 9/0819* (2013.01); *H04L 9/14* (2013.01)

(58) Field of Classification Search
None
See application file for complete search history.

(56) References Cited

U.S. PATENT DOCUMENTS 8,204,231 B2 * 6/2012 Maeda .................. H04L 9/0891 380/279
2006/0062392 A1 3/2006 Lee et al.
(Continued)

FOREIGN PATENT DOCUMENTS

JP 2008-306633 A 12/2008
JP 5288087 B2 9/2013
(Continued)

OTHER PUBLICATIONS

European Patent Office, Extended European Search Report in EP App. No. 24185778.8, 9 pages (Dec. 16, 2024).
(Continued)

*Primary Examiner* — Lisa C Lewis
(74) *Attorney, Agent, or Firm* — Finnegan, Henderson, Farabow, Garrett & Dunner, LLP

(57) ABSTRACT

According to an embodiment, a key management server device includes processing circuitry is configured to: receive, from a plurality of key generation nodes, quantum key distribution (QKD) keys generated through a key distillation process for QKD; identify QKD keys to be specified as targets for shaping processing with a partner key management server device, by exchanging identification information of the QKD keys with the partner key management server device; perform numbering in such a way that order of dividing a QKD key or of coupling a QKD key with a part of a QKD key that is not used in previous shaping processing is identical with the partner key management server device; and perform shaping processing for shaping key lengths of QKD keys to a fixed length by performing the division or the coupling in the order.

11 Claims, 12 Drawing Sheets

(51) Int. Cl.
*H04L 9/08* (2006.01)
*H04L 9/14* (2006.01)

(56) References Cited

U.S. PATENT DOCUMENTS

| | | | | |
|---|---|---|---|---|
| 2009/0316910 | A1* | 12/2009 | Maeda | H04L 9/0891 380/279 |
| 2012/0177201 | A1* | 7/2012 | Ayling | H04L 9/0858 380/278 |
| 2015/0213433 | A1* | 7/2015 | Khan | G06Q 20/3829 705/71 |
| 2015/0271147 | A1 | 9/2015 | Tanizawa et al. | |
| 2016/0197723 | A1* | 7/2016 | Takahashi | G06F 11/0709 380/255 |
| 2018/0109378 | A1 | 4/2018 | Fu | |
| 2019/0149327 | A1 | 5/2019 | Yuan et al. | |
| 2019/0190707 | A1* | 6/2019 | Tomita | G02F 1/035 |
| 2022/0029797 | A1* | 1/2022 | Tanaka | H04L 9/0861 |
| 2022/0131689 | A1 | 4/2022 | Ito et al. | |

FOREIGN PATENT DOCUMENTS

| | | | |
|---|---|---|---|
| JP | 5784612 | B2 | 9/2015 |
| JP | 2015-179989 | A | 10/2015 |
| JP | 2017-169187 | A | 9/2017 |
| JP | 6426477 | B2 | 11/2018 |
| JP | 2021-503204 | A | 2/2021 |
| JP | 2022-70059 | A | 5/2022 |
| WO | WO 2024/095451 | A1 | 5/2024 |

OTHER PUBLICATIONS

Taofiq K. Paraiso et al., "A modulator-free quantum key distribution transmitter chip," npj Quantum Inf., vol. 5, No. 42, https://www.nature.com/articles/s41534- 019-0158-7, 6 pages (2019).
Japan Patent Office, Decision to Grant a Patent in JP App. No. 2023-148034 (Jan. 27, 2026).

* cited by examiner

FIG.6

| KEY GENERATION NODE NUMBER | 1 | 2 | 3 |
|---|---|---|---|
| SPECIFICATION RATE (PERCENTAGE) | X | Y | Z |

FIG.7A

| KEY GENERATION NODE NUMBER | 1 | 2 | 3 |
|---|---|---|---|
| SPECIFICATION RATE (PERCENTAGE) | 1 | 1 | 1 |

| SPECIFICATION ORDER TABLE (KEY GENERATION NODE NUMBER) | 1 | 2 | 3 |
|---|---|---|---|

FIG.7B

| KEY GENERATION NODE NUMBER | 1 | 2 | 3 |
|---|---|---|---|
| SPECIFICATION RATE (PERCENTAGE) | 2 | 2 | 1 |

| SPECIFICATION ORDER TABLE (KEY GENERATION NODE NUMBER) | 1 | 2 | 1 | 2 | 3 |
|---|---|---|---|---|---|

FIG.7C

| KEY GENERATION NODE NUMBER | 1 | 2 | 3 |
|---|---|---|---|
| SPECIFICATION RATE (PERCENTAGE) | 3 | 2 | 1 |

| SPECIFICATION ORDER TABLE (KEY GENERATION NODE NUMBER) | 1 | 1 | 2 | 1 | 2 | 3 |
|---|---|---|---|---|---|---|

KEY MANAGEMENT SERVER DEVICE, QKD SYSTEM, AND KEY MANAGEMENT METHOD

CROSS-REFERENCE TO RELATED APPLICATIONS

This application is based upon and claims the benefit of priority from Japanese Patent Application No. 2023-148034, filed on Sep. 13, 2023; the entire contents of which are incorporated herein by reference.

FIELD

Embodiments described herein relate generally to a key management server device, a QKD system, and a key management method.

BACKGROUND

Conventionally, a quantum key distribution (QKD) device is known that sends data to and receives data from a singular key generation node. Consider a case in which a plurality of such key generation nodes is used; the QKD keys sent from those key generation nodes are collected in a single key management server; and shaping of the key length is performed either by dividing the QKD keys or by coupling the QKD keys. In that case, the mismatch in the generation timings of the QKD keys causes a mismatch between the transmitting side and the receiving side about the combination of the QKD keys to be divided or coupled.

Such mismatch among the key generation nodes can be eliminated by disposing a key management server with respect to each of a plurality of key generation nodes. However, as a result of disposing a plurality of key management servers, more operation resources get consumed. In order to solve that problem, it is necessary to resolve the issue of appropriately setting the combination of generation timings of the QKD keys between the transmitter and the receiver.

BRIEF DESCRIPTION OF THE DRAWINGS

FIG. 6 is a diagram illustrating an example of a specification rate table according to the second embodiment;

FIG. 7A is diagram illustrating a decision example 1 about a specification order table according to the second embodiment;

FIG. 7B is diagram illustrating a decision example 2 about the specification order table according to the second embodiment;

FIG. 7C is diagram illustrating a decision example 3 about the specification order table according to the second embodiment;

DETAILED DESCRIPTION

According to an embodiment, a key management server device includes processing circuitry is configured to: receive, from a plurality of key generation nodes, quantum key distribution (QKD) keys generated through a key distillation process for QKD, and store the QKD keys in a plurality of memories corresponding to the plurality of key generation nodes; identify QKD keys to be specified as targets for shaping processing with a partner key management server device, by exchanging identification information of the QKD keys with the partner key management server device; based on the identification information of the QKD keys, perform numbering in such a way that order of dividing a QKD key or of coupling a QKD key with a part of a QKD key that is not used in previous shaping processing is identical with the partner key management server device; and perform shaping processing for shaping key lengths of QKD keys to a fixed length by performing the division of the QKD key or the coupling of the QKD key with the part of the QKD key that is not used in the previous shaping processing in the order.

Exemplary embodiments of a key management server device, a QKD system, and a key management method will be explained below in detail with reference to the accompanying drawings.

First Embodiment

In a first embodiment, in a QKD system, an optical device and a key distillation process (hereinafter, called a "key generation node") are multiplexed, and a single key management server device obtains QKD keys from a plurality of key generation nodes. Then, the key management server device according to the first embodiment matches the order of the QKD keys between itself and a partner key management server device, to shape the key length either by dividing the QKD keys or by coupling the QKD keys. In the key management server device according to the first embodiment, the computation resources can be used in an efficient manner as compared to the case in which key management is performed in each singular key generation node.

Exemplary Functional Configuration

Figure 1:
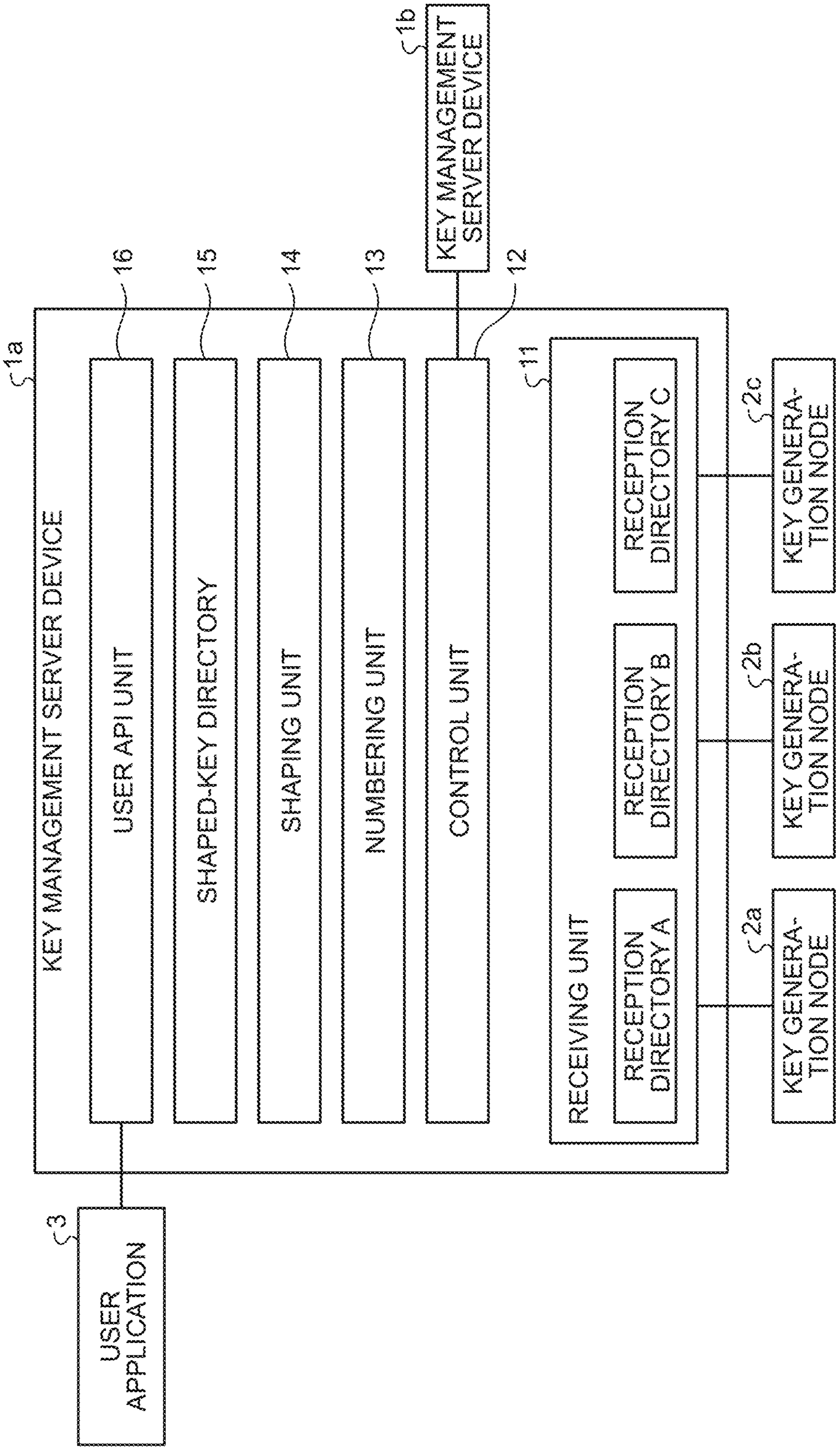
FIG. 1 is a diagram illustrating an exemplary functional configuration of a key management server device according to the first embodiment.

FIG. 1 is a diagram illustrating an exemplary functional configuration of a key management server device 1*a* according to the first embodiment. The key management server device 1*a* according to the first embodiment is connected to a plurality of key generation nodes 2*a* to 2*c* (representing optical devices and key distillation processes), a partner key management server device 1*b*, and a user application 3.

A QDK system according to the first embodiment includes the key generation nodes 2*a* to 2*c* (first key generation nodes) that generate QKD keys generated through the key distillation process for QKD; and includes the key management server device 1*a* (a first key management server device) that is connected to the key generation nodes 2*a* to 2*c*.

Moreover, in the QKD system according to the first embodiment, in an identical manner, the partner key management server device 1*b* (a second key management server device) too includes a plurality of key generation nodes (second key generation nodes) that generates QKD keys generated through the key distillation process for QKD.

Meanwhile, in FIG. 1, neither the functional configuration of the partner key management server device 1*b* is illustrated, nor a plurality of key generation nodes connected to the partner key management server device 1*b* is illustrated.

The key management server device 1 according to the first embodiment includes a receiving unit 11, a control unit 12, a numbering unit 13, a shaping unit 14, a shaped-key directory 15, and a user API unit 16 (API stands for Application Programming Interface).

The receiving unit 11 continuously receives QKD keys that are generated by the key generation nodes 2*a* to 2*c*, and stores the QKD keys in reception directories A to C (an example of a plurality of memory units) that correspond to the key generation nodes 2*a* to 2*c*, respectively. Each QKD key is assigned with identification information depending on whether it is generated by the key generation node 2*a*, or the key generation node 2*b*, or the key generation node 2*c*. For example, the identification information of a QKD key contains an identifier identifying that QKD key and contains an identifier identifying the key generation node from among the key generation nodes 2*a* to 2*c* that generates the concerned QKD key.

The control unit 12 exchanges the identifier of a QKD key with the partner key management server device 1*b*, so that the concerned QKD key is identified between the key management server device 1*a* and the partner key management server device 1*b*. More particularly, the control unit 12 monitors the receiving unit 11 and, when the receiving unit 11 receives a QKD key, exchanges the identifier of that QKD key with the partner key management server 1*b*. Thus, the control unit 12 requests the partner key management server device 1*b* to perform numbering based on the identification information of the QKD keys, such that the order of the QKD keys to be specified as the targets of shaping processing becomes the same, by sending the identification information of the QKD keys to the partner key management server device 1*b*.

Based on the identifiers of the QKD keys, the numbering unit 13 numbers the QKD keys in such a way that the QKD keys to be divided or coupled are in the same order in the key management server device 1*a* and the partner key management server device 1*b*. More particularly, when the control unit 12 confirms that the same QKD keys are present in the partner key management server device 1*b*, the numbering unit 13 assigns unique key numbers (QKD uniform key numbers) to the QKD keys generated by the plurality of key generation nodes 2.

The shaping unit 14 repeatedly performs shaping in such a way that a plurality of pairs of QKD keys between the key management server device 1*a* and the partner key management server device 1*b* is divided or coupled and each of a plurality of numbered QKD keys has a fixed key length.

The shaped-key directory 15 is used to store the QKD keys (encryption keys) that have been subjected to key length shaping.

The user API unit 16 provides an encryption key to the user application 3. For example, when a request for a QKD key is received from the user application 3; the user API unit 16 sends, to the user application 3, a QKD key shaped to have a fixed key length.

Meanwhile, the partner key management server device 1*b* has an identical functional configuration to the functional configuration of the key management server device 1*a*.

In the following explanation, when the key management server devices 1*a* and 1*b* need not be distinguished from each other, they are simply referred to as the key management server devices 1. Moreover, when the key generation nodes 2*a* to 2*c* need not be distinguished from each other, they are simply referred to as the key generation nodes 2.

In the following explanation, according to the practices used in the explanation about the field of cryptographic communication, the transmitting side (i.e., the key generation nodes 2 included in the transmitter of an optical device, and the key management server device 1*b* connected to that transmitter) is referred to as Alice. Moreover, the receiving side (i.e., the key generation nodes 2 included in the receiver of an optical device, and the key management server device 1*a* connected to that receiver) is referred to as Bob.

As a result of performing the key distillation process, regarding the generation of QKD keys in the Alice and in the Bob, synchronization is achieved in the key generation nodes 2*a* to 2*c*. Thus, as far as the same key generation node 2 is concerned, there is never a mismatch in the order of the QKD keys in the Alice and in the Bob.

Meanwhile, since the key generation nodes 2 generate QKD keys in a mutually asynchronous manner, there is a possibility that the identifier of a QKD key in a particular key generation node 2 is duplicated as the identifier of a QKD key in another key generation node 2.

Figure 2:
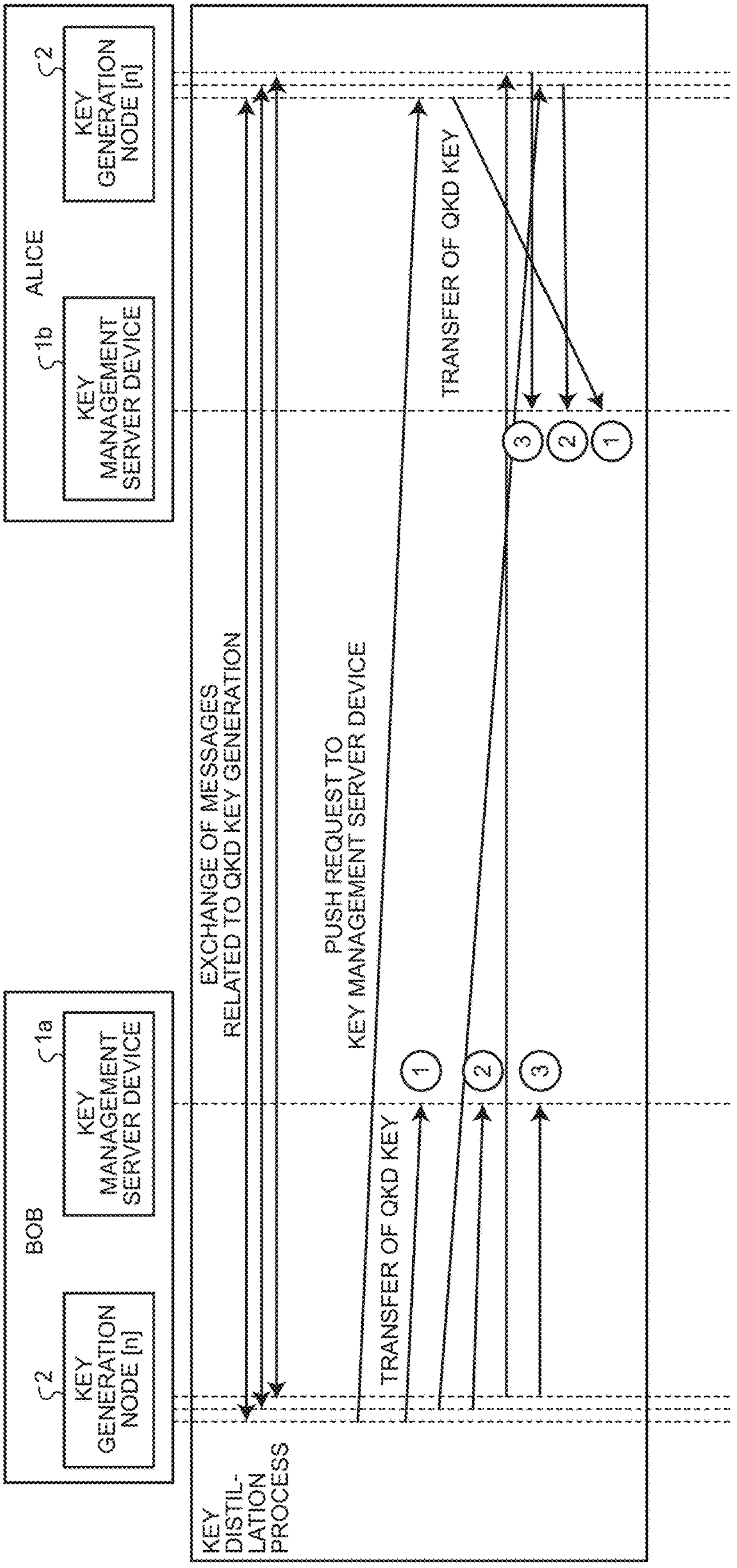
FIG. 2 is a diagram for explaining an example in which the order of the QKD keys on the transmitting side (Alice) does not match with the order of the QKD keys on the receiving side (Bob)

Explained below with reference to FIG. 2 is a case in which, when QKD keys are received from a plurality of key generation nodes 2, the order of the QKD keys in the Alice does not match with the order of the QKD keys in the Bob.

FIG. 2 is a diagram for explaining an example in which the order of the QKD keys on the transmitting side (Alice) does not match with the order of the QKD keys on the receiving side (Bob). In FIG. 2 is illustrated a case in which a count n indicating the number of key generation nodes 2 is equal to "3". However, the count n is not limited to be equal to "3" and can be equal to an arbitrary number.

Firstly, as a result of exchanging messages related to QKD key generation, pairs of QKD keys are generated across the Alice and the Bob.

After the pairs of QKD keys are generated across the Alice and the Bob, a push request meant for sending a QKD key to the key management server device 1*b* is issued by the key generation node 2 on the receiving side to the key generation node 2 on the transmitting side.

Then, using the file transfer protocol SCP, a QKD key is transferred from the key generation node 2 to the receiving unit 11.

At that time, because of the delay fluctuation in the communication network, sometimes the push requests issued by the key generation nodes 2 to the key management server device 1*b* reach at different timings to the key generation nodes 2 in the Alice. For that reason, the order of the key generation nodes 2 that issued the push requests in the Bob is sometimes different than the order of the key generation nodes 2 that receive the push requests in the Alice.

Moreover, in the SCP-based file transfer too, the data having a large size is transferred in successive packets. Hence, there are times when the transfer period starting from the transfer of a QKD key to the completion of transfer of data equivalent to a single file differs for each key generation node 2. For that reason, the order of the key generation nodes 2 that have completed the transfer in the Bob is sometimes different than the order of the key generation nodes 2 that have completed the transfer in the Alice.

Given below is the explanation of an operation performed in the key management server device 1*a* according to the first embodiment for matching the order of the QKD keys, which are to be subjected to key length shaping, across the key management server device 1*a* and the partner key management server device 1*b*.

Figure 3:
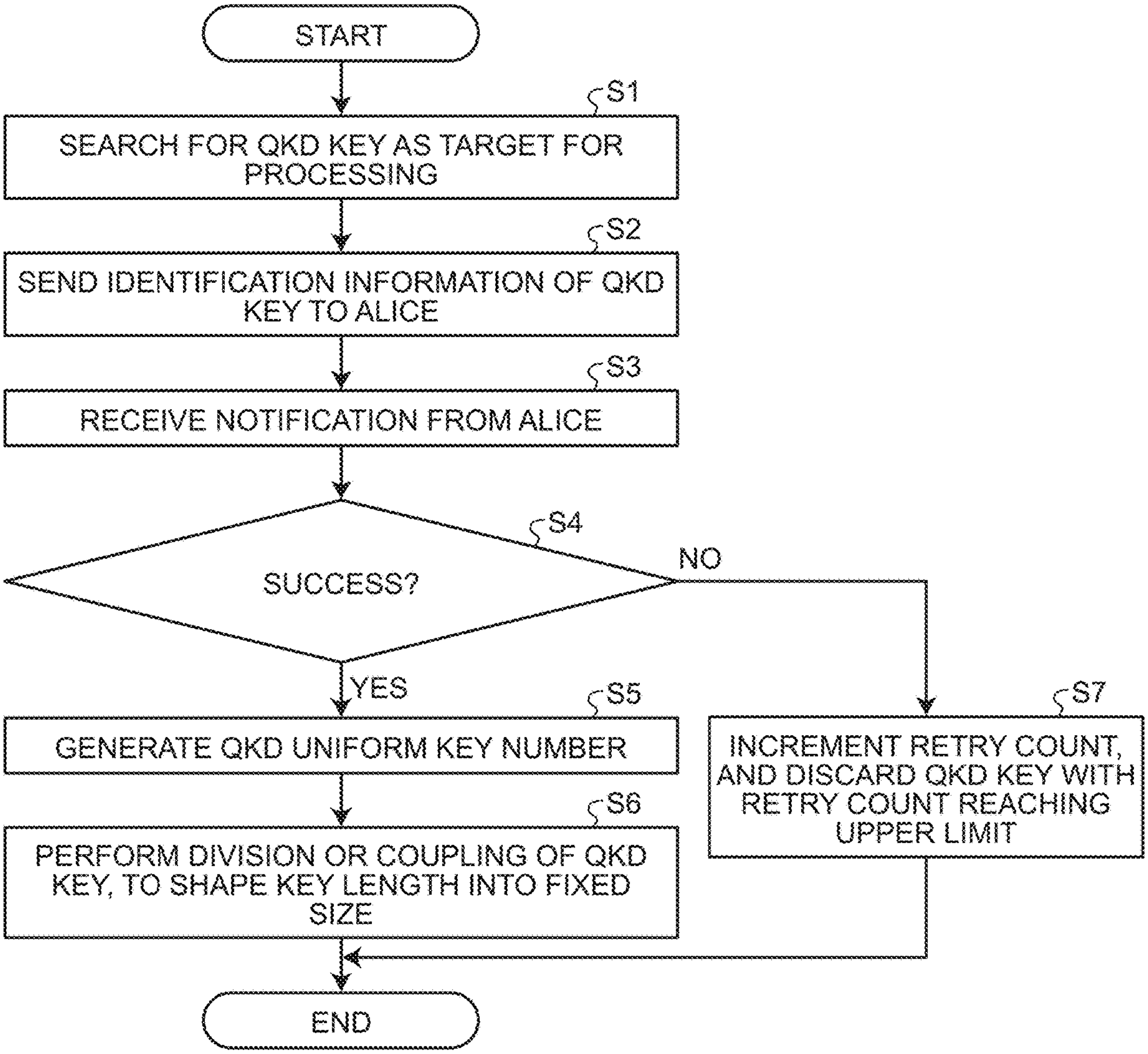
FIG. 3 is a flowchart for explaining an example of the operations performed in the key management server device on the receiving side according to the first embodiment.

FIG. 3 is a flowchart for explaining an example of the operations performed in the key management server device 1*a* on the receiving side (Bob) according to the first embodiment. Firstly, the control unit 12 of the Bob searches the reception directories A to C, in which the QKD keys are stored, for a QKD key that is not yet specified as the target for shaping processing or for the oldest QKD key from among the QKD keys that have been previously specified as the targets for shaping processing before the elapse of a certain period of time (Step S1).

Then, the control unit 12 sends, to the Alice, QKD key identification information that contains the identifier assigned to the QKD key retrieved at Step S1 and contains the identifier of the key generation node 2 that generates the concerned QKD key (Step S2).

Subsequently, the control unit 12 receives a notification from the Alice (Step S3). If the notification received at Step S3 is about a response indicating success, that is, if the notification indicates that the same QKD key is present in the Alice too (Yes Step S4), then the numbering unit 13 generates a QKD uniform key number identifying the QKD key as the target for processing retrieved at Step S1 (Step S5). The QKD uniform key number is generated based on the identifier of the key generation node 2 and the identifier of the QKD key and according to the rules prearranged with the Alice. For that reason, if those two identifiers are same, then the same QKD key uniform number is generated in the Alice and in the Bob.

Then, the shaping unit 14 performs the shaping processing for shaping the key length of the QKD key to a fixed length by either dividing the QKD key retrieved at Step S1 or coupling the QKD key retrieved at Step S1 with a part of the QKD key that is not used in the previous shaping processing in the order set according to the QKD key uniform numbers (Step S6).

Herein, a QKD key is stored in a file format, and is used in shaping starting from the data in the front part of that file. The unused data is stored in a buffer, and is used for coupling with the next key during the next key length shaping.

Meanwhile, at Step S4, if the response from the Alice does not indicate success (No at Step S4), then the control unit 12 increments the retry count with respect to the concerned QKD key, and discards the QKD key with the retry count reaching the upper limit (Step S7).

Until the retry count reaches the upper limit, for example, either among the QKD keys that are previously specified as the target for shaping processing before the elapse of a certain period of time or among the QKD keys that are yet to be specified as the targets for shaping processing, the control unit 12 searches for the QKD key to be specified as the target for shaping processing in chronological order of generation.

Given below is the explanation of an operation performed in the key management server device 1*b* according to the first embodiment for matching the order of the QKD keys, which are to be subjected to key length shaping, across the key management server device 1*b* and the partner key management server device 1*a*.

Figure 4:
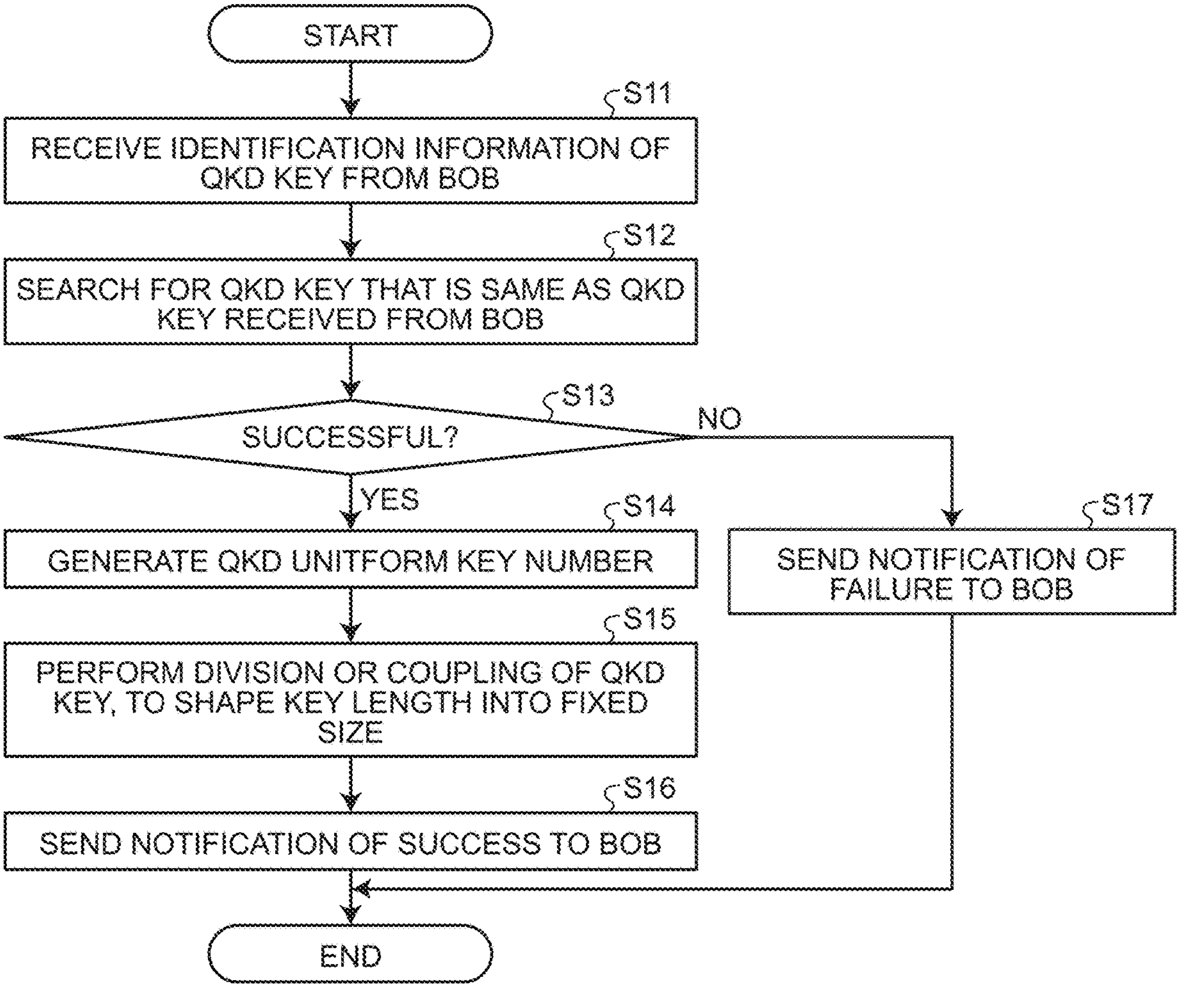
FIG. 4 is a flowchart for explaining an example of the operations performed in the key management server device on the transmitting side according to the first embodiment.

FIG. 4 is a flowchart for explaining an example of the operations performed in the key management server device 1*b* on the transmitting side (Alice) according to the first embodiment. Firstly, the control unit 12 of the Alice receives, from the Bob, the identification information of the QKD key (i.e., the identifier of the QKD assigned by the key generation node 2 and the identifier of the key generation node 2 that generates the QKD key) (Step S11).

Then, in the reception directories A to C of the receiving unit 11 of the Alice, the control unit 12 searches for the QKD key having the same identifier as the identifier of the QKD key that is sent from the Bob (Step S12).

If the same QKD key as the QKD key present in the Bob is found (Yes at Step S13), then the numbering unit 13 generates a QKD uniform key number for the concerned QKD key (Step S14).

Subsequently, the shaping unit 14 either divides the QKD key having the QKD uniform key number assigned thereto or couples the QKD key, which has the QKD uniform key assigned thereto, with a QKD key that is left over in the previous time, to shape the key length into a fixed size (Step S15).

Herein, in an identical manner to the case of the receiving side (Bob), a QKD key is stored in a file format, and is used in shaping starting from the data in the front part of that file. The unused data is stored in a buffer, and is used for coupling with the next key during the next key length shaping.

Subsequently, the control unit 12 sends a notification of success to the Bob (Step S16).

Meanwhile, at Step S13, if the same QKD key as the QKD key present in the Bob is not found (No at Step S13), then the control unit 12 responds to the Bob with a notification of failure (Step S17).

As explained above, in the key management server device 1*a* according to the first embodiment, the receiving unit 11 receives QKD keys, which are generated through a QKD key distillation process, from the key generation nodes 2*a* to 2*c*; and stores the QKD keys in a plurality of memory units corresponding to the key generation nodes 2*a* to 2*c* (in the first embodiment, in the reception directories A to C, respectively). The control unit 12 exchanges the identification information of the QKD key with the partner key management server device 1*b*, and identifies the QKD key, which is to be specified as the target for shaping processing with the partner key management server device 1*b*. Based on the identification information of the QKD keys, the numbering unit 13 performs numbering in such a way that the order of dividing a QKD key or of coupling a QKD key with a part of QKD key that is not used in the previous shaping is same as the order in the partner key management server device 1*b*. Then, the shaping unit 14 performs shaping processing of shaping the key length of the QKD to a fixed length by either dividing a QKD key or coupling a QKD key with a part of a QKD key that is not used in the previous shaping processing in the order set by the numbering unit 13.

As a result, according to the first embodiment, even when a plurality of key generation nodes 2*a* to 2*c* is connected to the key management server device 1*a*, it becomes possible to prevent a mismatch in the shaping of the QKD keys. More particularly, between the pair of the key management server devices 1*a* and 1*b*, the QKD key generation timings that are likely to be different in the key generation nodes 2*a* to 2*c* on the transmitting side than in the key generation nodes 2*a* to 2*c* on the receiving side can be set in an appropriate order by the numbering unit 13.

According to the first embodiment, it becomes possible to achieve further reduction in the operation resources used in the shaping processing, and to prevent a mismatch among the QKD keys thereby enabling prevention of a decline in the key generation rate that may occur due to any such mismatch.

Second Embodiment

Given below is the description of a second embodiment. In the description of the second embodiment, the same explanation as given in the first embodiment is not repeated. Thus, the following explanation is given only about the differences with the first embodiment.

Exemplary Functional Configuration

Figure 5:
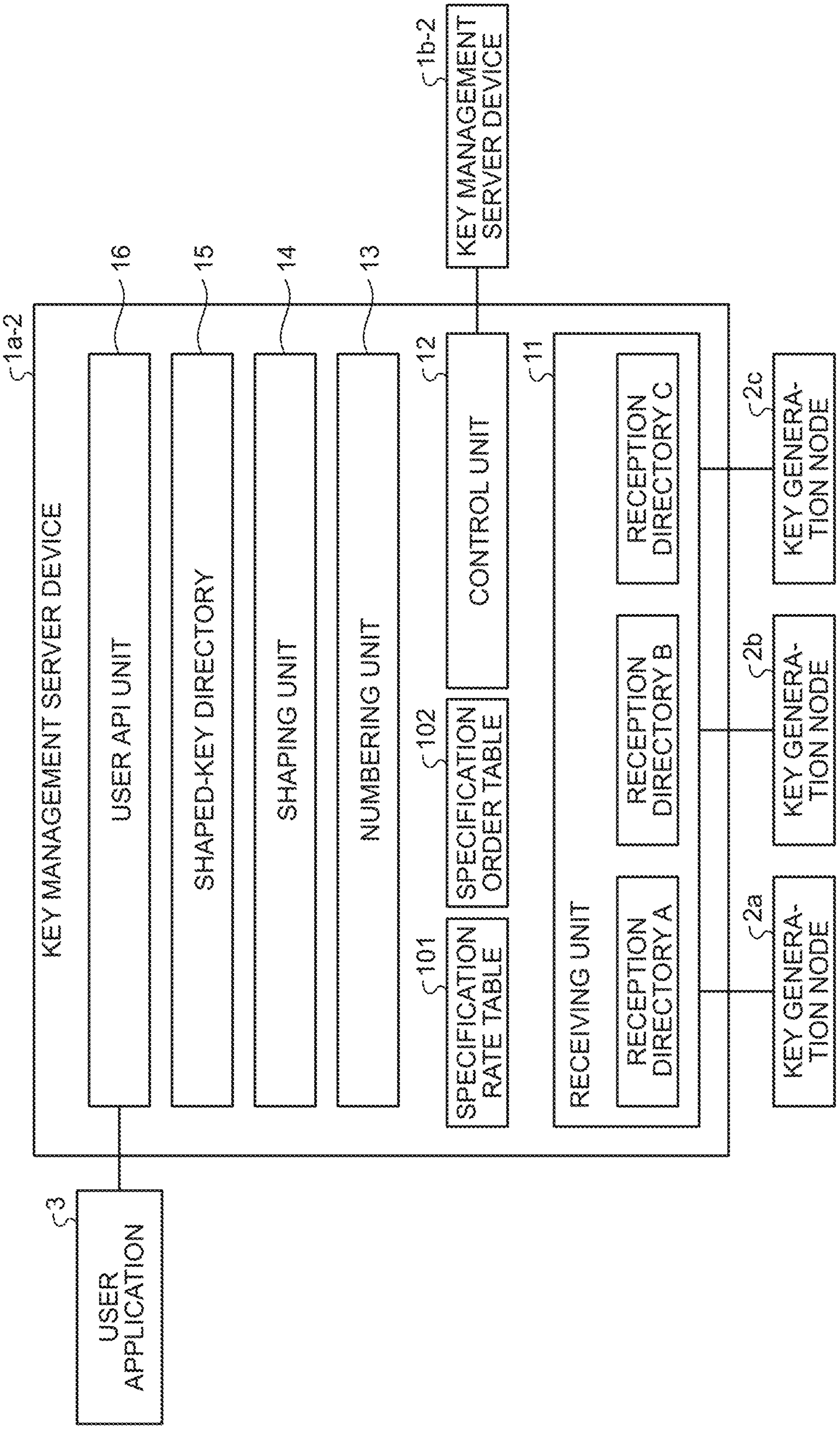
FIG. 5 is a diagram illustrating an exemplary functional configuration of a key management server device according to a second embodiment.

FIG. 5 is a diagram illustrating an exemplary functional configuration of a key management server device 1*a*-2 according to the second embodiment. The key management server device 1*a*-2 according to the second embodiment includes the receiving unit 11, the control unit 12, the numbering unit 13, the shaping unit 14, the shaped-key directory 15, and the user API unit 16.

The key management server device 1*a*-2 according to the second embodiment further stores therein a specification rate table 101 and a specification order table 102. The specification rate table 101 and the specification order table 102 are used by the control unit 12 at the time of performing control.

Based on the specification rate table 101 and the specification order table 102, the control unit 12 according to the second embodiment decides on the reference order for referring to the reception directories A to C, which receive the specification of the QKD keys to be subjected to shaping of the key length, in such a way that the reference order is same between the key management server device 1*a*-2 and a partner key management server device 1*b*-2.

Example of Specification Rate Table

FIG. 6 is a diagram illustrating an example of the specification rate table 101 according to the second embodiment. In the specification rate table 101 illustrated in FIG. 6, combinations of a key generation node number and a specification rate are defined. For example, a key generation node number 1 enables identification of the key generation node 2*a*. Moreover, a key generation node number 2 enables identification of the key generation node 2*b*. Furthermore, a key generation node number 3 enables identification of the key generation node 2*c*.

Moreover, specification rates X, Y, and Z represent the rates each of which indicates the frequency of obtaining the QKD key as the target for processing. Thus, greater the specification rate, the higher is the frequency of obtaining the QKD key as the target for processing.

The control unit 12 on the receiving side (Bob) waits for a communication message, which indicates whether or not the same QKD key is present in the partner key management server device 1*b*-2, until the elapse of a predetermined timeout period. The control unit 12 counts the number of timeouts for each key generation node 2 that has generated QKD keys, and varies the specification rates in the specification rate table 101 according to that count.

The specification rate either can be calculated simply by taking the inverse proportion of the count or can be calculated by applying weighted rules. The specification rate table 101 is used in deciding on the specification order table 102.

Examples of Deciding on Specification Order Table

FIGS. 7A to 7C are diagrams illustrating decision examples 1 to 3 about the specification order table 102 according to the second embodiment. In FIGS. 7A to 7C are illustrated the examples in which the specification order table 102 is decided from the specification rate table 101, and the order of specifying the key generation nodes 2 is decided according to the specification rates.

For example, in the example illustrated in FIG. 7A, since all specification rates are same, the specification is repeated in the order of the key generation node 2*a*, the key generation node 2*b*, and the key generation node 2*c*.

Moreover, for example, in the example illustrated in FIG. 7B, the key generation node 2*c* having a greater number of timeouts is set to have a lower specification rate as compared to the key generation nodes 2*a* and 2*b*. Hence, the specification is repeated in the order of the key generation node 2*a*, the key generation node 2*b*, the key generation node 2*a*, the key generation node 2*b*, and the key generation node 2*c*.

Furthermore, for example, in the example illustrated in FIG. 7C, the specification order table 102 is created according to the following rules. Firstly, the key generation nodes 2 having the highest specification rate are placed in the specification order table 102 in order from the key generation node 2 present on the left side of the specification rate table 101, and then the specification rate of the already-placed key generation nodes 2 is decremented from the specification rate table 101. Subsequently, from among the key generation nodes having the highest specification rate in the post-decrementing specification rate table 101, the key generation nodes 2 are placed in the specification order table 102 in order starting from the key generation node 2 present on the left side of the specification rate table 101. As a result of repeating such operations, the specification order table 102 illustrated in FIG. 7C is created.

Meanwhile, the method for deciding on the specification order from the specification rate table can be set in a random manner as long as the rate is matching over a single cycle of repetition.

The control unit 12 keeps looking in the reception directories A to C of the receiving unit 11 while referring to the specification order table 102. When a QKD key is received in any one reception directory, the control unit 12 exchanges the identification of the QKD key with the partner key management server 1*b*-2 and waits for a response of a QKD key in the next directory.

Moreover, the control unit 12 confirms that the same QKD key is present in the partner key management server 1*b*-2 and rewrites the specification rate table 101 according to the failure rate of confirmation with the partner key management server 1*b*-2.

When the identification information of the QKD key that could be confirmed with the key management server 1*b*-2 is received from the control unit 12, the numbering unit 13 assigns a QKD key uniform number as explained earlier.

In an identical manner to the first embodiment, the numbered QKD key is shaped by the shaping unit 14 to have a fixed key length and is stored in the shaped-key directory 15. When the user application 3 requests for the QKD key, the user API unit 16 sends, to the user, the QKD key that is stored in the shaped-key directory 15.

Given below is the explanation of an operation performed in the key management server device 1*a*-2 according to the second embodiment for matching the order of the QKD keys, which are to be subjected to key length shaping, across the key management server device 1*a*-2 and the partner key management server device 1*b*-2 based on the specification order table 102.

Figure 8:
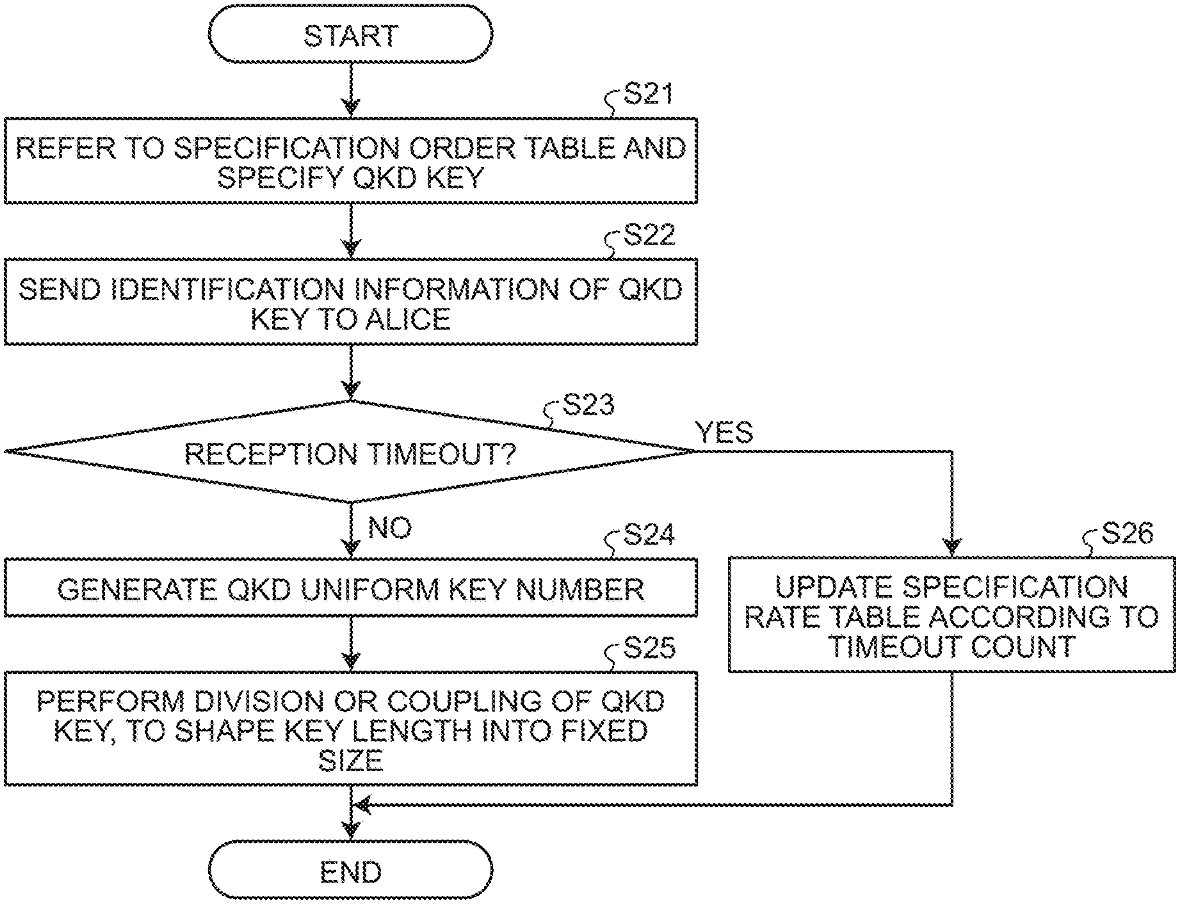
FIG. 8 is a flowchart for explaining an example of the operations performed in the key management server device on the receiving side according to the second embodiment.

FIG. 8 is a flowchart for explaining an example of the operations performed in the key management server device 1*a*-2 on the receiving side (Bob) according to the second embodiment. Firstly, the control unit 12 of the Bob refers to the specification order table 102 and specifies the QKD key stored in the reception directory corresponding to the concerned key generation node (Step S21).

Then, the control unit 12 sends, to the Alice, the identification information of the QKD key (i.e., the identifier of the QKD key as assigned by the key generation node 2 and the identifier of the key generation node 2 that generates the QKD key) specified at Step S21 (Step S22).

Subsequently, the control unit 12 waits for a response from the Alice and, if a response is received from the Alice without the occurrence of a timeout (No at Step S23), then the numbering unit 13 generates the QKD uniform key number (Step S24).

Subsequently, the shaping unit 14 either divides the QKD key having the QKD uniform key number assigned thereto or couples the QKD key, which has the QKD uniform key number assigned thereto, with a QKD key that is left over in the previous time, to shape the key length into a fixed size (Step S25).

Meanwhile, if a the timeout occurs (Yes at Step S23), then the control unit 12 updates the timeout counter and updates the specification rate table 101 according to that counter (Step S26).

Given below is the explanation of an operation performed in the key management server device 1*b*-2 according to the second embodiment for matching the order of QKD keys, which are to be subjected to key length shaping, across the key management server device 1*b*-2 and the partner key management server device 1*a*-2.

Figure 9:
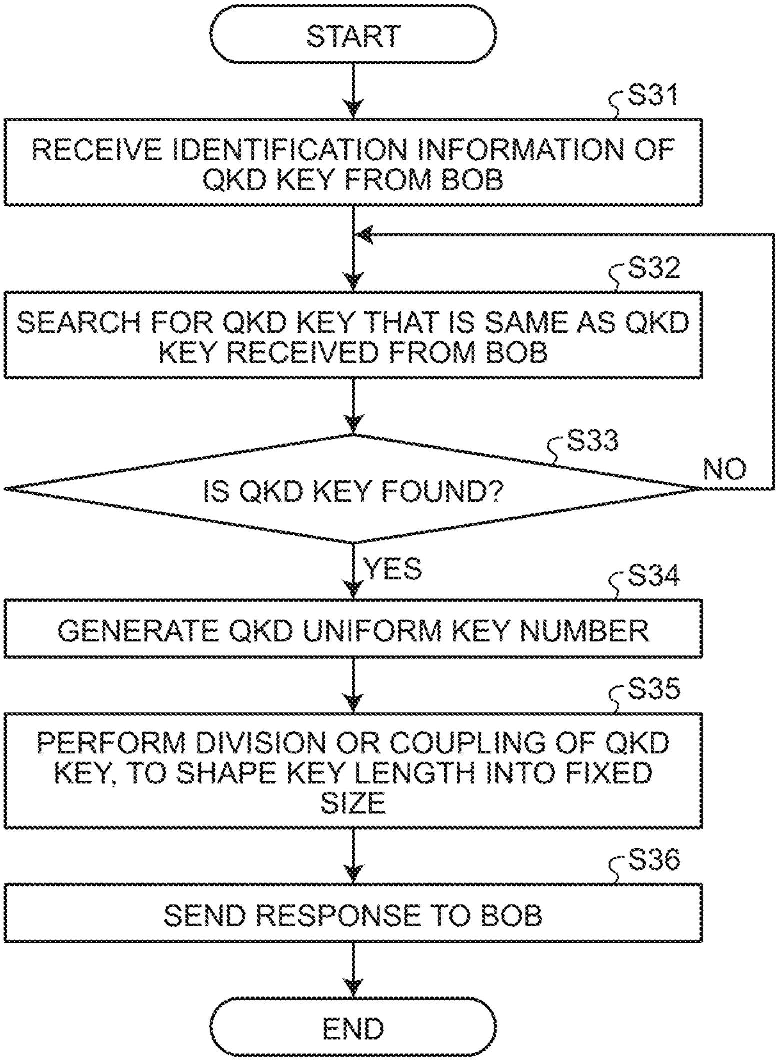
FIG. 9 is a flowchart for explaining an example of the operations performed in the key management server device on the transmitting side according to the second embodiment.

FIG. 9 is a flowchart for explaining an example of the operations performed in the key management server device 1*b*-2 on the transmitting side (Alice) according to the second embodiment. The operations performed at Steps S31 and S32 are identical to the operations performed at Steps S11 and S12, respectively, (see FIG. 4) according to the first embodiment. Hence, that explanation is not given again.

Subsequently, if the same QKD key as the QKD key present in the Bob is found (Yes at Step S33), then the numbering unit 13 of the Alice generates a QKD uniform key number (Step S34).

On the other hand, if the same QKD key as the QKD key present in the Bob is not found (No at Step S33), then the control unit 12 waits until the concerned QKD key is received from the key generation node 2 and is stored in the corresponding reception directory (i.e., the system control returns to Step S32).

Herein, if the waiting goes on for a certain period of time, then either the Alice can send a timeout message to the Bob or the Bob can determine about the timeout without the Alice sending any timeout message.

Meanwhile, when the identification information of the next QKD is sent from the Bob, the wait state either can be released or can be released only for a certain period of time.

Then, the shaping unit 14 either divides the QKD key having the QKD uniform key number assigned thereto or couples the QKD key, which has the QKD uniform key assigned thereto, with a QKD key that is left over in the previous time, to shape the key length into a fixed size (Step S35). Subsequently, the control unit 12 sends a response (a notification of success) to the Bob (Step S36).

As explained above, in the second embodiment, the control unit 12 sequentially refers to a plurality of memory units (in the second embodiment, the reception directories A to C) according to specification order information (in the second embodiment, the specification order table 102) that indicates the order of reading the QKD keys, which are specified as the targets for shaping processing, from a plurality of memory units. Then, the control unit 12 exchanges, with the partner key management server device 1*b*-2, the identification information of the QKD keys read from a plurality of memory units according to the specification order information; and identifies the QKD keys specified as the targets for shaping processing with the partner key management server device 1*b*-2.

Moreover, the control unit 12 according to the second embodiment sends, to the partner kay management server device 1*b*-2, the identification information of the QKD key specified as the target for shaping processing; receives, from the partner key management server device 1*b*-2, a response indicating the existence of the QKD key specified as the target for shaping processing; and, decreases the percentage of having a turn referring to the memory unit that is used to store the QKD key specified as the target for shaping processing (in the second embodiment, the reception directories A to C), with increase in waiting time of the response (refer to the earlier explanation with reference to FIGS. 7A to 7C).

That is, in the second embodiment, each of the key management server devices 1*a*-2 and 1*b*-2, which form a pair, divides or couples the QKD keys generated by the corresponding key generation nodes 2*a* to 2*c* and performs the shaping processing for shaping the QKD keys. In the second embodiment, as a result of deciding on the specification order for the reception directories that are used to store the QKD keys specified as the target QKD keys for shaping, it becomes possible to hold down the operation resources, and to prevent a mismatch among the QKD keys thereby enabling prevention of a decline in the key generation rate that may occur due to any such mismatch. Moreover, in the second embodiment, as compared to the first embodiment described earlier, the communication between the Bob and the Alice can be further simplified on account of the fixed specification order for the reception directories A to C.

Third Embodiment

Given below is the description of a third embodiment. In the description of the third embodiment, the same explanation as given in the first embodiment is not repeated. Thus, the following explanation is given only about the differences with the first embodiment.

Exemplary Functional Configuration

Figure 10:
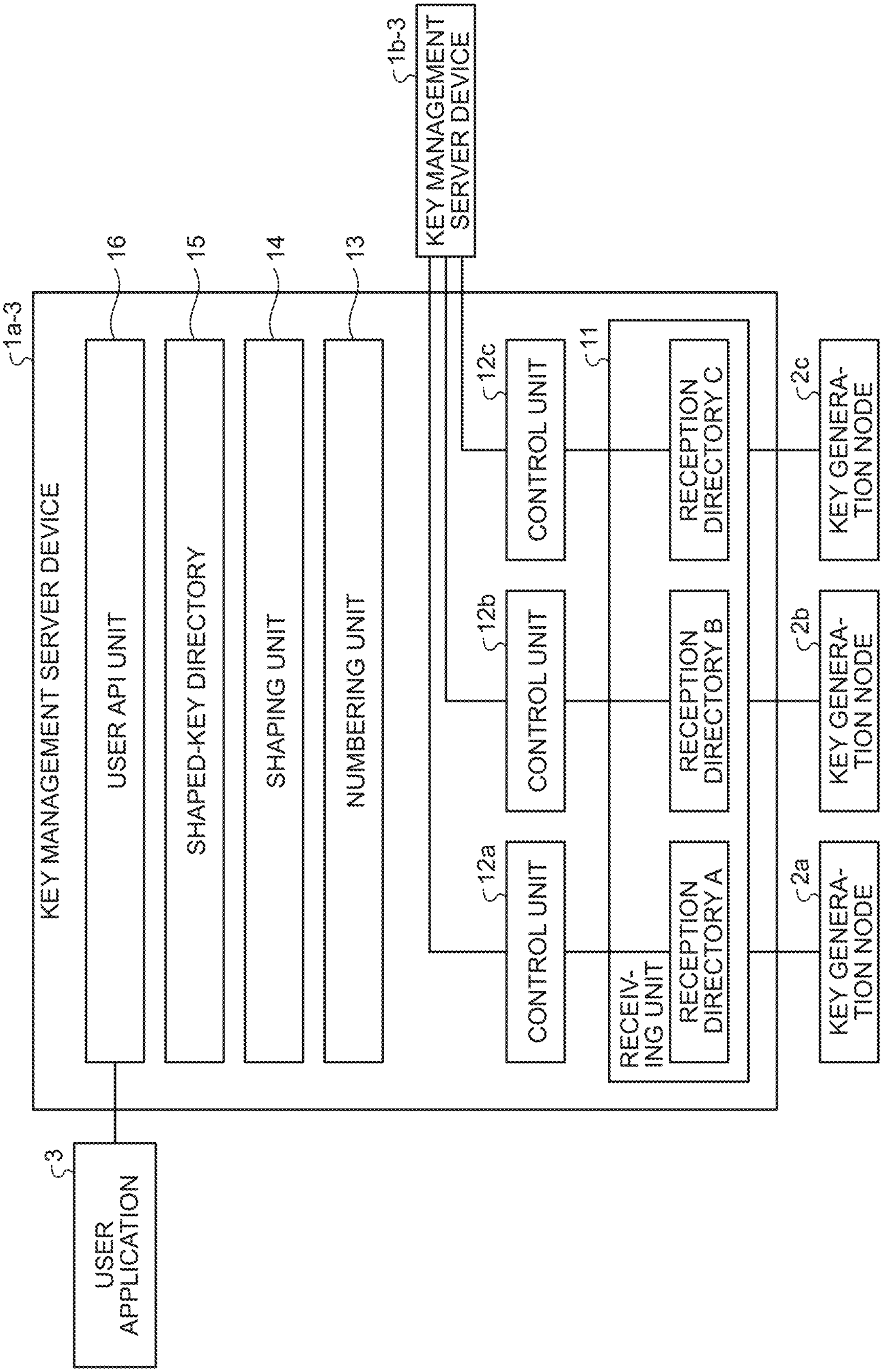
FIG. 10 is a diagram illustrating an exemplary functional configuration of a key management server device according to a third embodiment.

FIG. 10 is a diagram illustrating an exemplary functional configuration of a key management server device 1*a*-3 according to the third embodiment. The key management server device 1*a*-3 according to the third embodiment includes the receiving unit 11, control units 12*a* to 12*c*, the numbering unit 13, the shaping unit 14, the shaped-key directory 15, and the user API unit 16.

Each of the control units 12*a* to 12*c* according to the third embodiment individually controls, with respect to the corresponding pairing key generation node 2, key length shaping with a partner key management server device 1*b*-3. The partner key management server device 1*b*-3 too includes the control units 12*a* to 12*c* each corresponding to one pairing key generation node 2.

For example, the control unit 12*a* corresponding to the reception directory A exchanges the identification information of QKD keys with the control unit 12*a* of the partner key management server device 1*b*-3. The control units 12*b* and 12*c* perform identical operations to the control unit 12*a*.

The numbering unit 13 receives the identification information of the QKD keys that could be confirmed with the partner key management server 1*b*-3 and assigns the key numbers. Then, the shaping unit 14 performs shaping with respect to the numbered QKD keys to ensure that the numbered QKD keys have a fixed key length, and stores those QKD keys in the shaped-key directory 15.

Meanwhile, as far as a single key generation node 2 is concerned, in the key distillation process, the order of generation of QKD keys is guaranteed. That is, as explained above in the first and second embodiments, as long as the QKD keys generated by the key generation nodes 2*a* to 2*c* do not get mixed, no mismatch occurs in the order of the QKD keys explained above in the second embodiment.

Given below is the explanation of an operation performed in the key management server device 1*a*-3 according to the third embodiment for matching the order of the QKD keys, which are to be subjected to key length shaping, across the key management server device 1*a*-3 and the partner key management server device 1*b*-3.

Figure 11:
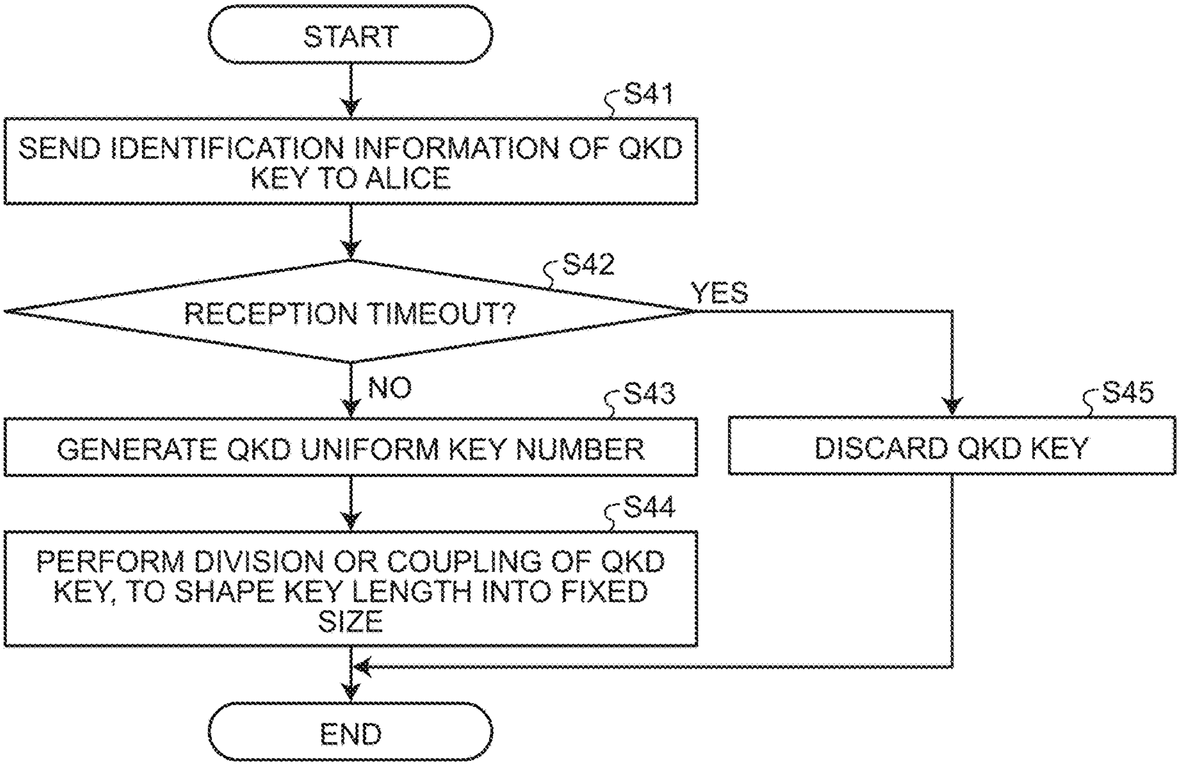
FIG. 11 is a flowchart for explaining an example of the operations performed in the key management server device on the receiving side according to the third embodiment.

FIG. 11 is a flowchart for explaining an example of the operations performed in the key management server device 1*a*-3 on the receiving side (Bob) according to the third embodiment. Firstly, the control unit 12*a* (12*b*, 12*c*) of the Bob sends, to the Alice, the identification information of the QKD key stored in the corresponding reception directory A (B, C) (i.e., the identifier of the QKD key assigned by the key generation node 2*a* (2*b*, 2*c*) and the identifier of the key generation node 2*a* (2*b*, 2*c*) that generates the QKD key) (Step S41).

Then, the control unit 12*a* (12*b*, 12*c*) waits for a response from the Alice and, if a response is received from the Alice without the occurrence of a timeout (No at Step S42), then the numbering unit 13 generates the QKD uniform key number (Step S43).

Subsequently, the shaping unit 14 either divides the QKD key having the QKD uniform key number assigned thereto or couples the QKD key, which has the QKD uniform key number assigned thereto, with a QKD key that is left over in the previous time, to shape the key length into a fixed size (Step S44). In the third embodiment, with respect to the QKD keys whose identification information contains the same identifier for the key generation node 2, the division or the coupling is performed based on the order set according to the QKD uniform key numbers.

Meanwhile, if a timeout occurs (Yes at Step S42), then the control unit 12*a* (12*b*, 12*c*) discards the concerned QKD key (Step S45) and waits until the next QKD key is received from the key generation node 2*a* (2*b*, 2*c*) and is stored in the reception directory A (B, C).

Given below is the explanation of an operation performed in the key management server device 1*b*-3 according to the third embodiment for matching the order of the QKD keys, which are to be subjected to key length shaping, across the partner key management server device 1*b*-3 and the partner key management server device 1*a*-3.

Figure 12:
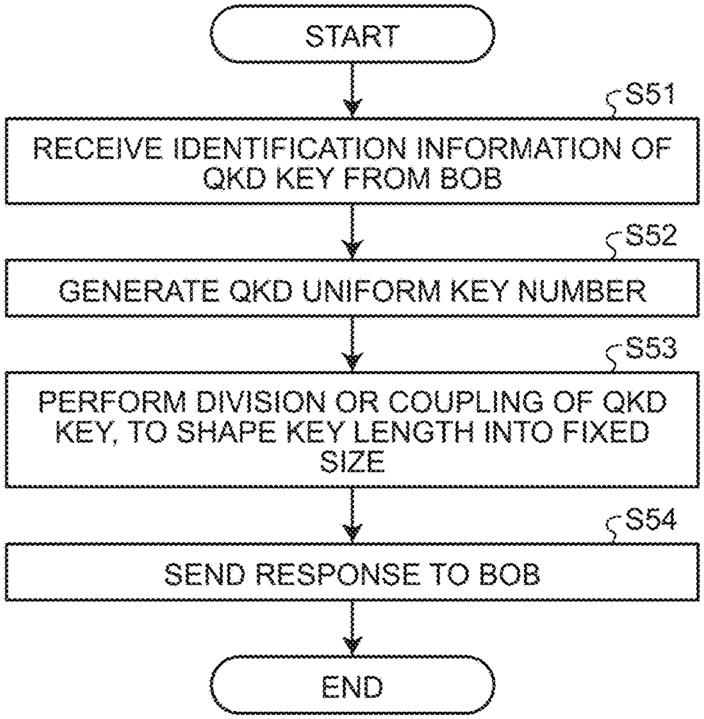
FIG. 12 is a flowchart for explaining an example of the operations performed in the key management server device on the transmitting side according to the third embodiment.

FIG. 12 is a flowchart for explaining an example of the operations performed in the key management server device 1*b*-3 on the transmitting side (Alice) according to the third embodiment. Firstly, the receiving unit 11 of the Alice receives the identification information of a QKD key from the Bob (Step S51) and, based on the identifier of the key generation node 2 as included in the identification information of the QKD key, allots the QKD key to that control unit from among the control units 12*a* to 12*c* which forms a pair with the concerned key generation node 2.

Subsequently, the numbering unit 13 receives, from each of the control units 12*a* to 12*c*, the QKD key that is identified by the QKD key identifier as included in the QKD key identification information, and generates the QKD uniform key number for that QKD key (Step S52).

Then, the shaping unit 14 either divides the QKD key having the QKD uniform key number assigned thereto or couples the QKD key, which has the QKD uniform key assigned thereto, with a QKD key that is left over in the previous time, to shape the key length into a fixed size (Step S44). In the third embodiment, with respect to the QKD keys whose identification information contains the same identifier for the key generation node 2, the division or the coupling is performed based on the order set according to the QKD uniform key numbers.

Subsequently, each of the control units 12*a* to 12*c* sends a response (a notification of success) to the Bob (Step S54).

As explained above, the key management server device 1*b*-3 according to the third embodiment includes a plurality of control units each of which identifies, with the partner key management server device 1*b*-3, the QKD keys stored in the corresponding memory unit from among a plurality of memory units (in the third embodiment, the reception directories A to C). Then, with respect to the QKD keys whose identification information contains the same identifier for the key generation node 2, the shaping unit 14 performs the division or the coupling in the order set according to the QKD uniform key numbers.

That is, according to the third embodiment, in each of the key management server devices 1*a*-3 and 1*b*-3 that form a pair, the QKD keys of the key generation nodes 2*a* to 2*c* are divided or coupled separately for each of the key generation nodes 2 that generate the QKD keys. As a result, as compared to the first and second embodiment, there is no need to correct the order of key shaping according to the generation timings at which the QKD keys are generated by the key generation nodes 2. That enables achieving further simplification of the flow of the shaping processing for shaping the QKD keys.

Lastly, given below is the explanation about an exemplary hardware configuration of the key management server device 1 (1-2, 1-3) according to the first embodiment to the third embodiment.

(Exemplary Hardware Configuration)

Figure 13:
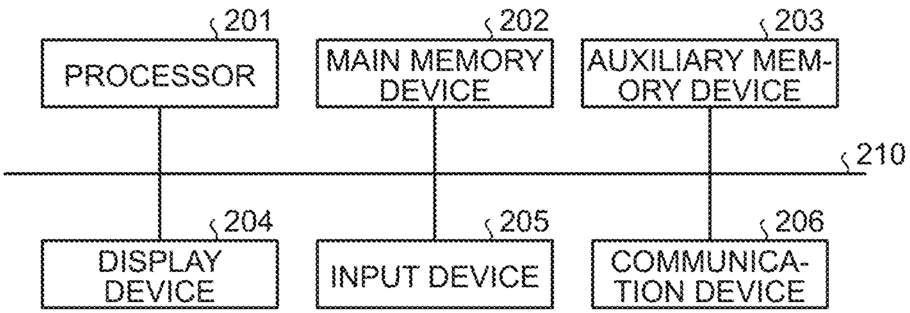
FIG. 13 is a diagram illustrating an exemplary hardware configuration of the key management server devices according to the first to third embodiments.

FIG. 13 is a diagram illustrating an exemplary hardware configuration of the key management server device 1 (1-2, 1-3) according to the first embodiment to the third embodiment. The key management server device 1 (1-2, 1-3) according to the first embodiment to the third embodiment includes a processor 201, a main memory device 202, an auxiliary memory device 203, a display device 204, an input device 205, and a communication device 206. The processor 201, the main memory device 202, the auxiliary memory device 203, the display device 204, the input device 205, and the communication device 206 are connected to each other by a bus 210.

Meanwhile, in the key management server device 1 (1-2, 1-3), some of the constituent elements can be omitted. For example, when the input function and the display function of an external device is available for use, the key management server device 1 (1-2, 1-3) need not include the display device 204 and the input device 205.

The processor 201 executes a computer program that has been read from the auxiliary memory device 203 into the main memory device 202. The main memory device 202 is a memory such as a read only memory (ROM) or a random access memory (RAM). The auxiliary memory device 203 is a hard disk drive (HDD) or a memory card.

Each of the reception directories A to C of the receiving unit 11 as well as the shaped-key directory 15 is implemented using the main memory device 202 and the auxiliary memory device 203.

The display device 204 is, for example, a liquid crystal display. The input device 205 represents an interface meant for operating the key management server device 1 (1-2, 1-3). Meanwhile, the key management server device 1 (1-2, 1-3) can have a touch-sensitive panel that is equipped with the display function and the input function. The communication device 206 represents an interface meant for communicating with other devices.

For example, the computer program executed in the key management server device 1 (1-2, 1-3) is recorded as an installable file or an executable file in a computer-readable memory medium such as a memory card, a hard disk, a compact disc rewritable (CD-RW), a compact disc read only memory (CD-ROM), or a compact disc recordable (CD-R); and is provided as a computer program product.

Alternatively, for example, the key management server device 1 (1-2, 1-3) can be stored in a downloadable manner in a computer connected to a network such as the Internet.

Still alternatively, for example, the key management server device 1 (1-2, 1-3) can be distributed, without involving downloading, via a network such as the Internet.

Still alternatively, for example, the key management server device 1 (1-2, 1-3) can be stored in advance in a ROM.

The computer program executed in key management server device 1 (1-2, 1-3) has modular configuration that includes functions, from among the functional configuration explained earlier, also implementable using a computer program. Regarding such functions, as the actual hardware, the processor 201 reads the computer program from the memory medium and executes it, so that the function blocks explained earlier are loaded in the main memory device 202. That is, the function blocks explained earlier are generated in the main memory device 202.

Meanwhile, some or all of the functions explained earlier can be implemented using hardware such as an integrated circuit (IC) instead of implementing them using software.

Moreover, the functions can be implemented using a plurality of processors 201. In that case, each processor 201 either can implement one of the functions, or can implement two or more functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key management server device comprising processing circuitry configured to:
 - receive, from a plurality of key generation nodes, quantum key distribution (QKD) keys generated through a key distillation process for QKD, and store the QKD keys in a plurality of memories corresponding to the plurality of key generation nodes;
 - identify QKD keys to be specified as targets for shaping processing with a partner key management server device, by exchanging identification information of the QKD keys with the partner key management server device;
 - based on the identification information of the QKD keys, perform numbering for each key generation node in such a way that an order of the QKD keys in the key management server device is identical to an order of QKD keys in the partner key management server device; and
 - perform shaping processing for shaping key lengths of the QKD keys to a fixed length by performing division of a QKD key or coupling of a QKD key with a part of a QKD key that is not used in the previous shaping processing in the order of the QKD keys in the key management server device.

2. The device according to claim 1, wherein the processing circuitry is further configured to provide the QKD keys shaped to have the fixed length, to a user application.

3. The device according to claim 1, wherein the identification information of the QKD keys contains identifiers of the QKD keys and identifiers of key generation nodes that generated the QKD keys.

4. The device according to claim 1, wherein
 the processing circuitry is configured to:
 - request the partner key management server device to perform numbering based on the identification information of the OKD keys in such a way that the order is identical, by sending the identification information of the QKD keys to the partner key management server device; and
 - perform the shaping processing for shaping a key length of a OKD key to the fixed length by performing the division of the QKD key or the coupling of the QKD key with the part of the OKD key that is not used in the previous shaping processing in the order, when receiving, from the partner key management server device, a notification indicating that a OKD key identified by the identification information of the QKD key exists.

5. The device according to claim 4, wherein the processing circuitry is configured to, when receiving, from the partner key management server device, a notification indicating that a OKD key identified by the identification information of the QKD keys does not exist, search for, as a QKD key to be specified as the target for the shaping processing, either a QKD key that has been previously specified as a target for shaping processing before elapse of a predetermined period of time, or a OKD key that is specified as the target for shaping in chronological order of generation, from among QKD keys not yet specified as a target for shaping processing.

6. The device according to claim 4, wherein the processing circuitry is configured to discard a QKD key that has been specified as a target for shaping processing for a predetermined number of times, without receiving a notification indicating that a QKD key identified by the identification information of the QKD key exists, from the partner key management server device.

7. The device according to claim 1, wherein the processing circuitry is configured to sequentially refer to the plurality of memories according to specification order information indicating order of reading, from the plurality of memories, QKD keys to be specified as targets for shaping processing, and identify the QKD keys to be specified as the targets for the shaping processing with the partner key management server device, by exchanging, with the partner key management server device, the identification information of the OKD keys that are read from the plurality of memories according to the order specification information.

8. The device according to claim 7, wherein the processing circuitry is configured to send, to the partner key management server device, identification information of a OKD key to be specified as a target for shaping processing, receives, from the partner key management server device, a response indicating that the QKD key to be specified as the target for the shaping processing exists, and decreases percentage of taking a turn referring to a memory that stores the QKD key to be specified as the target for the shaping processing, with increase in waiting time of the response.

9. The device according to claim 1, wherein the processing circuitry is configured to identify, with the partner key management server device, QKD keys each stored in one of the plurality of memories, the identification information of the QKD keys contains identifiers of the QKD keys and identifiers of key generation nodes that generate the OKD keys, and the processing circuitry is configured to perform the division or the coupling in the order, on QKD keys having an identical identifier of a key generation node contained in identifiers of the QKD keys.

10. A QKD system comprising:

a plurality of first key generation nodes that generate quantum key distribution (QKD) keys generated through a key distillation process for QKD;

a first key management server device that is connected to the plurality of first key generation nodes;

a plurality of second key generation nodes that generate QKD keys through a key distillation process for QKD; and a second key management server device that is connected to the plurality of second key generation nodes and to the first key management server device, wherein the first key management server device includes:

processing circuitry configured to receive the QKD keys from the plurality of first key generation nodes, and stores the QKD keys in a plurality of memories corresponding to the plurality of first key generation nodes;

identify QKD keys to be specified as targets for shaping with the second key management server device, by exchanging identification information of the QKD keys with the second key management server device;

based on the identification information of the QKD keys, perform numbering for each first key generation node in such a way that an order of the QKD keys in the first key management server device is identical to an order of QKD keys in the second key management server device; and perform shaping processing for shaping key lengths of the QKD keys to a fixed length by performing division of a QKD key or coupling of a QKD key with a part of a QKD key that is not used in the previous shaping processing in the order of the QKD keys in the first key management server device.

11. A key management method comprising:

receiving, by a key management server device, from a plurality of key generation nodes, quantum key distribution (QKD) keys generated through a key distillation process for QKD, and storing the QKD keys in a plurality of memories corresponding to the plurality of key generation nodes;

identifying, by the key management server device, QKD keys to be specified as targets for shaping processing with a partner key management server device by exchanging identification information of the QKD keys with the partner key management server device;

performing numbering, by the key management server device, based on the identification information of the QKD keys, in such a way that an order of the QKD keys in the key management server device is identical to an order of QKD keys in the partner key management server device; and performing shaping processing, by the key management server device, for shaping key lengths of the QKD keys to a fixed length by performing division of a QKD key or performing coupling of a QKD key with a part of a QKD key that is not used in previous shaping processing in the order of the QKD keys in the key management server device.

* * * * *